US012579017B2

(12) United States Patent
Doddi et al.

(10) Patent No.: US 12,579,017 B2
(45) Date of Patent: Mar. 17, 2026

(54) APPARATUS AND METHODS FOR SECURING INTEGRITY AND DATA ENCRYPTION LINK SESSIONS WITHIN DIE INTERCONNECT ARCHITECTURES

(71) Applicant: QUALCOMM Incorporated, San Diego, CA (US)

(72) Inventors: Ravindranath Doddi, Hyderabad (IN); Sanchana Vasan S, Coimbatore (IN); Umamaheshwaran V, Salem (IN)

(73) Assignee: Qualcomm Incorporated, San Diego, CA (US)

( * ) Notice: Subject to any disclaimer, the term of this patent is extended or adjusted under 35 U.S.C. 154(b) by 118 days.

(21) Appl. No.: 18/416,980

(22) Filed: Jan. 19, 2024

(65) Prior Publication Data

US 2025/0238297 A1    Jul. 24, 2025

(51) Int. Cl.
*G06F 11/07* (2006.01)

(52) U.S. Cl.
CPC ........ *G06F 11/076* (2013.01); *G06F 11/0709* (2013.01)

(58) Field of Classification Search
CPC ............................. G06F 11/076; G06F 11/0709
See application file for complete search history.

(56) References Cited

U.S. PATENT DOCUMENTS

| | | | | |
|---|---|---|---|---|
| 8,516,128 B2 * | 8/2013 | Thywissen | .......... | H04L 65/1059 |
| | | | | 709/227 |
| 9,086,945 B2 * | 7/2015 | Bolen | ...................... | G06F 13/00 |
| 11,190,598 B2 * | 11/2021 | Hassler | .................. | H04L 67/14 |

| | | | | |
|---|---|---|---|---|
| 2019/0103961 A1 * | 4/2019 | Chhabra | ............... | H04L 9/0838 |
| 2021/0112618 A1 * | 4/2021 | Jeon | ........................ | H04W 76/19 |
| 2023/0127223 A1 * | 4/2023 | Khatri | .................... | G06F 21/73 |
| | | | | 726/22 |
| 2023/0195551 A1 | 6/2023 | Krishnamurthy et al. | | |
| 2024/0012772 A1 | 1/2024 | Safranek et al. | | |

FOREIGN PATENT DOCUMENTS

WO        2023/225885       11/2023

OTHER PUBLICATIONS

International Search Report (ISR) and Written Opinion issued by EPO acting as ISR for related application PCT/US2025/010745, filed on Jan. 8, 2025, entitled, "Apparatus and Methods for Securing Integrity and Data Encryption Link Sessions Within Die Interconnect Architectures," ISR dated Mar. 31, 2025, 12 pages.

* cited by examiner

*Primary Examiner* — Jigar P Patel
(74) *Attorney, Agent, or Firm* — Smith Tempel Blaha LLC

(57)        ABSTRACT

Methods and apparatuses are provided to detect errors within device link sessions, and to disable the link sessions based on the detected errors. In one example, a die includes a non-transitory, machine-readable storage medium storing instructions. The die also includes at least one processor coupled to the non-transitory, machine-readable storage medium. The at least one processor is configured to execute the instructions to detect an error within a link session with a device. The at least one processor is also configured to execute the instructions to decrement an index value corresponding to the link session based on the detected error. Further, the at least one processor is configured to execute the instructions to compare the index value to a threshold value. The at least one processor is also configured to execute the instructions to disable the link session with the device based on the comparison.

20 Claims, 6 Drawing Sheets

APPARATUS AND METHODS FOR SECURING INTEGRITY AND DATA ENCRYPTION LINK SESSIONS WITHIN DIE INTERCONNECT ARCHITECTURES

BACKGROUND

Field of the Disclosure

This disclosure relates generally to die interconnect architectures and, more particularly, to integrity and data encryption link sessions within die interconnect architectures.

Description of Related Art

Die-to-die interconnect architectures allow dies, such as chiplets, to communicate over communication channels. These die-to-die interconnect architectures are used across a multitude of applications, such as telecommunication, automotive, cloud-based, gaming, enterprise, and networking applications, among various other applications. Die-to-die interconnect architectures may be developed according to a standard thereby allowing interoperability between dies, such dies from varying manufacturers. For example, Universal Chiplet Interconnect Express (UCIe)® defines an open standard that allows dies to communicate over various channels. The UCIe® architecture can support various protocols, such as Peripheral Component Interconnect Express (PCIe)®, Compute Express Link (CXL)®, and others as well. These protocols can allow for Integrity and Data Encryption (IDE) data streams between ports. For instance, a first device acting as host may form an IDE connection with a second device that supports one or more endpoints. The IDE connection may be formed between corresponding ports of the first and second devices.

For various reasons, these data streams can experience errors. For instance, when an IDE error occurs, the IDE stream must be re-established to allow further communications. In an example of a compromised or rogue device, an IDE stream between a host and the compromised or rogue device may experience multiple, or even continuous, IDE errors, thereby resulting in repeated attempts to re-establish the IDE stream. These IDE stream re-establishment procedures cost the host bandwidth while keeping the corresponding link busy with control traffic attempting to re-establish the IDE stream. The IDE stream re-establishment procedures may also introduce latencies to servicing other ports, and can cause the host and compromised or rogue device additional power consumption. As such, there are opportunities to address deficiencies associated with IDE link sessions of die interconnect architectures.

SUMMARY

According to one aspect, an apparatus includes a non-transitory, machine-readable storage medium storing instructions, and at least one processor coupled to the non-transitory, machine-readable storage medium. The at least one processor is configured to detect an error within a link session with a device. Based on the detected error, the at least one processor is configured to decrement an index value corresponding to the link session. Further, the at least one processor is configured to compare the index value to a threshold value. Based on the comparison, the at least one processor is configured to disable the link session with the device.

According to another aspect, a method by at least one processor includes detecting an error within a link session with a device. Based on the detected error, the method also includes decrementing an index value corresponding to the link session. Further, the method includes comparing the index value to a threshold value. Based on the comparison, the method includes disabling the link session with the device.

According to yet another aspect, a non-transitory, machine-readable storage medium stores instructions that, when executed by at least one processor, causes the at least one processor to perform operations. The operations include detecting an error within a link session with a device. Based on the detected error, the operations also include decrementing an index value corresponding to the link session. Further, the operations include comparing the index value to a threshold value. Based on the comparison, the operations include disabling the link session with the device.

According to even another aspect, a die comprises a first port configured to provide a link session with a device, at least one register, and a processor communicatively coupled to the first port and the at least one register. The processor is configured to establish the link session with the device using the first port. The processor is also configured to read a value from the at least one register and, based on the value, detect an error within the link session. Based on the detected error, the processor is configured to decrement an index value corresponding to the link session. Further, the processor is configured to compare the index value to a threshold value. Based on the comparison, the processor is configured to write a second value to the at least one register, the write causing a disabling of the link session with the device.

DETAILED DESCRIPTION

Figure 1:
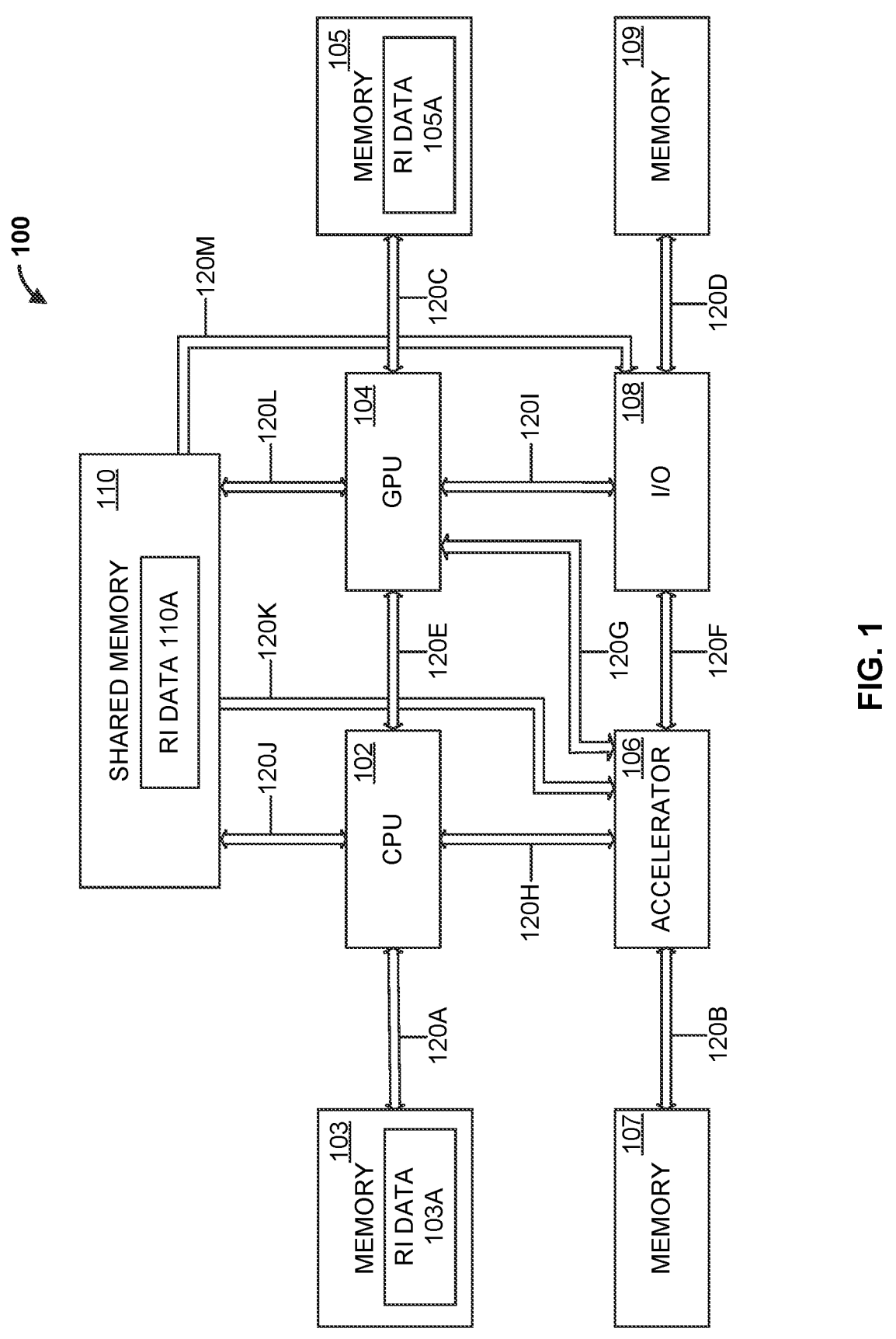
FIG. 1 is a block diagram of a die package, according to some implementations.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

The embodiments described herein are directed to detecting errors within link sessions, such as those with a compromised or faulty device, and disabling the link sessions. To detect errors, a host may maintain a reliability index for endpoints, and may track the reliability of end points based on link errors. The host may disable a link session with an endpoint based on a number of errors detected.

For instance, UCIe® defines a layered protocol that includes a protocol layer, a die-to-die adapter (e.g., adapter layer), and a physical layer. The die-to-die adapter provides link state management and negotiation capabilities among others, while the physical layer controls electrical signaling, clocking, link training, and main-band and sideband communication channels, as well as other capabilities. Further, UCIe® architecture supports various protocols, such as Peripheral Component Interconnect Express (PCIe)®, Compute Express Link (CXL)®, and can support others through a supported streaming protocol. Dies may establish link sessions between each other using any of these protocols.

For instance, the CXL® standard defines three protocols including CXL.io, CXL.cache, and CXL.mem. Using one or more of these protocols, a host (e.g., a die configured as host) and an endpoint (e.g., a die configured as an endpoint) may establish an Integrity and Data Encryption (IDE) stream between them. Each of the host and the endpoint may include CXL® registers to configure the IDE stream. For instance, the host and endpoint may be communicatively coupled over corresponding ports. The host and endpoint may initially establish a secure session through exchanged Security Protocol and Data Model (SPDM) messages. These SPDM messages can allow for the exchange of version information (e.g., hardware and software version information), security capabilities, and algorithm negotiation information. Once the secure session (e.g., SPDM secure session) is established, the host and endpoint may exchange key-related data over the secure session (e.g., in accordance with an IDE Key management protocol) to program and activate keys for encrypting and decrypting data (e.g., flits) to be transmitted over the IDE stream. After the keys have been established, the IDE stream may be established, and secure data may be exchanged between the host and the endpoint (e.g., using the CXL.cache protocol).

During these secure data exchanges, however, errors can occur. When an error occurs, the secure session may transition to a non-secure session. Further, the error may be reported in a CXL® error register (e.g., uncorrectable error register), and may be signaled between the host and the endpoint using the corresponding CXL® error signaling mechanism. Once an error occurs, the IDE stream must be re-established between the host and the endpoint die. In other words, the host and the endpoint re-establish the secure session through exchanged SPDM messages. Once the secure session is re-established, the host and endpoint re-exchange key-related data over the re-established secure session to program and activate the keys for encrypting and decrypting data. After the keys have been established, the IDE stream is re-established, and secure data may again be exchanged between the host and the endpoint. In the case of a compromised or faulty endpoint device, for instance, errors may repeatedly occur, thereby causing the IDE sessions to be repeatedly re-established.

In some embodiments, the host maintains a reliability index table. The reliability index table may be maintained within a memory device. For example, the reliability index table may be maintained within a Replay Protected Memory Block (RPMB) of a memory device of the host. The reliability index table may include a reliability index value for each endpoint. For instance, the host may be communicatively coupled to a number of endpoints through corresponding ports. The host may maintain a reliability index table that includes a reliability index value corresponding to each of the endpoints. Further, the host may initialize reliability index value to an initial value (e.g., 0, 100, 1000, etc.). The host may determine the initial value based on data stored in a memory device (e.g., configuration data stored in the memory device), one or more fuses (e.g., e-fuses), or a user-programmed value, for example.

When an IDE error occurs during an established IDE stream between the host and an endpoint, the host may detect the error, and may adjust (e.g., increment or decrement) the reliability index value corresponding to the endpoint. For example, the host may receive signaling indicating that an IDE error occurred, and based on the signaling, may decrement the reliability index value corresponding to the endpoint. After adjusting the reliability index value, the host may compare the adjusted reliability index value to a threshold value. If the adjusted reliability index value matches the threshold value, the host disables the link between the host and the endpoint, thereby preventing further IDE sessions from being established. For instance, the host may write to a CXL® register to disable the port corresponding to the endpoint.

In some examples, the host may generate capabilities data indicating that the host does not support communications (e.g., IDE sessions), and may transmit the capabilities data to the endpoint before disabling the corresponding port. To re-establish an IDE session, in some instances, the endpoint must be disconnected from the host, and reconnected again. In other instances, the host may automatically re-enable the port when a predetermined amount of time has passed since the port was disabled. If, however, the adjusted reliability index value does not match the threshold value (e.g., the adjusted reliability index value is greater than the threshold value), the host re-establishes the IDE session with the endpoint.

Among other advantages, the embodiments can enhance the security of a system by considering the connection history of endpoints before allowing a subsequent IDE connection. In addition, the embodiments may reduce overhead on a system caused by repeated IDE establishment procedures, thereby providing otherwise used bandwidth for other data processing operations. Persons of ordinary skill in the art having the benefit of the disclosures herein may recognize these and other advantages of the embodiments as well.

FIG. 1 is a block diagram of an integrated circuit package 100 (e.g., die package) that includes various dies (e.g., chiplets), such as central processing unit (CPU) die 102, graphical processing unit (GPU) die 104, accelerator die 106, and input/output (I/O) die 108. In addition, integrated circuit package 100 includes memory dies (e.g., random access memory (RAM) dies, read-only memory (ROM) dies, etc.), such as memory die 103, memory die 105, memory die 107, memory die 109, and shared memory 110. In some examples, one or more of the memory dies, such as shared memory 110, is a non-volatile memory device. Each of the various dies may be coupled to one or more other dies via interconnects 120. For example, CPU die 102 is coupled to memory die 103 via interconnect 120A, to GPU die 104 via interconnect 120E, to accelerator die 106 via interconnect 120H, and to shared memory 110 via interconnect 120J. GPU die 104 is further coupled to shared memory 110 via interconnect 120L, to memory die 105 via interconnect 120C, to accelerator die 106 via interconnect 120G, and to I/O die 108 via interconnect 120I. Accelerator die 106 is also coupled to memory die 107 via interconnect 120B, to shared memory 110 via interconnect 120K, and to I/O die 108 via interconnect 120F. I/O die 108 is further coupled to memory die 109 via interconnect 120D, and to shared memory 110 via interconnect 120M. Each of the interconnects 120 may be implemented as UCIe® interconnects, for example.

Integrated circuit package 100 is merely exemplary, and in other embodiments, an integrated circuit package may include any other suitable dies which may replace, or be added in addition to, any of the dies illustrated with respect to integrated circuit package 100. In addition, integrated circuit package 100 may be coupled to one or more other integrated circuit packages. For instance, a first integrated circuit package 100 may be coupled, over one or more interconnects 120, to a second integrated circuit package 100. These integrated circuit packages, including integrated circuit package 100, may be implemented in various types of devices, such as within networking devices, telecommunication devices, smartphone devices, gaming devices, enterprise devices, storage devices (e.g., cloud storage devices), and computing devices (e.g., cloud computing devices), among other types of devices.

In some embodiments, a die may be configured as a host and may maintain, within one of the memory dies, maintain reliability index (RI) data characterizing RI values for one or more endpoints. For example, CPU die 102 can be configured as a host and maintain, within memory die 103, RI data 103A. RI data 103A may include an RI value for each endpoint connected to a port of CPU die 102. For instance, accelerator die 106 may be configured as an endpoint to CPU die 102. Additionally or alternatively, GPU die 104 may be configured as an endpoint to CPU die 102. As such, RI data 103A may include a first RI value corresponding to accelerator die 106, and a second RI value corresponding to GPU die 104. As described herein, CPU die 102 may initialize the RI values of RI data 103A to a predetermined value (e.g., 100).

Further, CPU die 102 may establish link session (e.g., IDE session) with any endpoints, such as with accelerator die 106 and/or GPU die 104. For instance, CPU die 102 and accelerator die 106 may initially establish a secure session through exchanged Security Protocol and Data Model (SPDM) messages over interconnect 120H. Once the secure session established, CPU die 102 and accelerator die 106 may exchange key-related data over the secure session to program and activate keys for encrypting and decrypting data (e.g., flits). For instance, CPU die 102, as host, may program a key to accelerator die 106, configured as the endpoint. After the keys have been established, a link session (e.g., IDE stream) is established between CPU die 102 and accelerator die 106, and secure data may be exchanged over interconnect 120H (e.g., using the CXL-.cache protocol). CPU die 102 may perform similar operations with any other endpoints, such as with GPU die 104 when GPU die 104 is configured as an endpoint.

As described herein, an error (e.g., signaling error, data error, etc.) may occur during secure data exchanges of the link session (e.g., established IDE stream) between the CPU die 102 and the accelerator die 106. When an error occurs, the CPU die 102 may detect the error, and may adjust the RI value within RI data 103A corresponding to the accelerator die 106. For example, a physical layer of CPU die 102 may detect the error, and may write a value characterizing the error to a corresponding error register. Further, and based on the detected error, CPU die 102 may decrement the RI value within RI data 103A corresponding to the accelerator die 106. CPU die 102 may then compare the adjusted RI value to a threshold value. The threshold value may be stored within an internal memory of CPU die 102, for example.

Based on the comparison, if the adjusted RI value matches the threshold value, CPU die 102 may write to a register, such as a physical layer register, to disable the link session over interconnect 120H. As an example, the interconnect

120H may connect a port of the CPU die 102 to a port of the accelerator die 106. CPU die 102 may write to a register, causing the port of the CPU die 102 to become disabled. In some examples, CPU die 102 may generate capabilities data indicating that CPU die 102 does not support communications (e.g., IDE sessions), and may transmit the capabilities data to the accelerator die 106 over a non-secure session. CPU die 102 may then disable the port corresponding to accelerator die 106. If, however, the adjusted RI value does not match the threshold value (e.g., the adjusted reliability index value is greater than the threshold value), CPU die 102 re-establishes the link session with the accelerator die 106. If another error occurs, CPU die 102 may repeat the above process, including adjusting the RI value, and comparing the adjusted RI value to the threshold value to determine whether to disable the port corresponding to accelerator die 106.

Similarly, in some examples, GPU die 104 can be configured as a host and maintain, within memory die 105, RI data 105A. RI data 105A may include an RI value for each endpoint connected to a port of GPU die 104. For instance, one or more of accelerator die 106, I/O die 108, and CPU die 102 may be configured as an endpoint to GPU die 104. As such, RI data 105A may include a first RI value corresponding to accelerator die 106, a second RI value corresponding to CPU die 102, and a third RI value corresponding to I/O die 108. As described herein, GPU die 104 may initialize the RI values of RI data 105A to a predetermined value.

Further, GPU die 104 may establish link session (e.g., IDE session) with any endpoints, such as with accelerator die 106, I/O die 108, and/or CPU die 102. For instance, GPU die 104 and I/O die 108 may initially establish a secure session through exchanged SPDM messages over interconnect 120I. Once the secure session established, GPU die 104 and I/O die 108 may exchange key-related data over the secure session to program and activate keys for encrypting and decrypting data (e.g., flits). For instance, GPU die 104, as host, may program a key to I/O die 108, configured as the endpoint. After the keys have been established, a link session (e.g., IDE stream) is established between GPU die 104 and I/O die 108, and secure data may be exchanged over interconnect 120I (e.g., using the CXL.cache protocol). GPU die 104 may perform similar operations with any other endpoints, such as with accelerator die 106 and/or CPU die 102 when CPU die 102 is configured as an endpoint.

When an error occurs during secure data exchanges between GPU die 104 and I/O die 108, a physical layer of GPU die 104 may detect the error, and may write a value characterizing the error to a corresponding error register. Further, and based on the detected error, GPU die 104 may decrement the RI value within RI data 105A corresponding to the I/O die 108. GPU die 104 may then compare the adjusted RI value to a threshold value. The threshold value may be stored within an internal memory of GPU die 104, or within memory die 105, for example.

Based on the comparison, if the adjusted RI value matches the threshold value, GPU die 104 may write to a register, such as a physical layer register, to disable the link session over interconnect 120I. As an example, the interconnect 120I may connect a port of the GPU die 104 to a port of the I/O die 108. GPU die 104 may write to a register, causing the port of the GPU die 104 to become disabled. In some examples, GPU die 104 may generate capabilities data indicating that GPU die 104 does not support communications (e.g., IDE sessions), and may transmit the capabilities data to the I/O die 108 over a non-secure session. GPU die 104 may then disable the port corresponding to I/O die 108.

If, however, the adjusted RI value does not match the threshold value (e.g., the adjusted reliability index value is greater than the threshold value), GPU die 104 re-establishes the link session with the I/O die 108.

In some instances, one or more of CPU die 102 and GPU die 104 may maintain corresponding RI data, such as RI data 110A, within shared memory 110. As such, CPU die 102 and GPU die 104 may share RI values of endpoints with each other. As an example, each of CPU die 102 and GPU die 104 may be configured as hosts to accelerator die 106 over corresponding ports. For instance, during a first temporal interval, the CPU die 102 may be configured as host to the accelerator die 106 configured as an endpoint. If any errors occur during an established link session, the CPU die 102 may adjust (e.g., decrement) the RI value within RI data 110A associated with the accelerator die 106. CPU die 102 may adjust the RI value for each error detected, or until the RI value reaches the threshold value. If the RI value reaches the threshold value, CPU die 102 may disable the port corresponding to the accelerator die 106, as described herein.

After the first temporal interval, the CPU die 102 and accelerator die 106 may end the link session. During a second temporal interval, the GPU die 104 may be configured as host to the accelerator die 106 configured as an endpoint. If any errors occur during an established link session, the GPU die 104 may adjust (e.g., decrement) the RI value within RI data 110A associated with the accelerator die 106. GPU die 104 may adjust the RI value for each error detected, or until the RI value reaches the threshold value. If the RI value reaches the threshold value, GPU die 104 may disable the port corresponding to the accelerator die 106, as described herein.

Figures 2A, 2B:
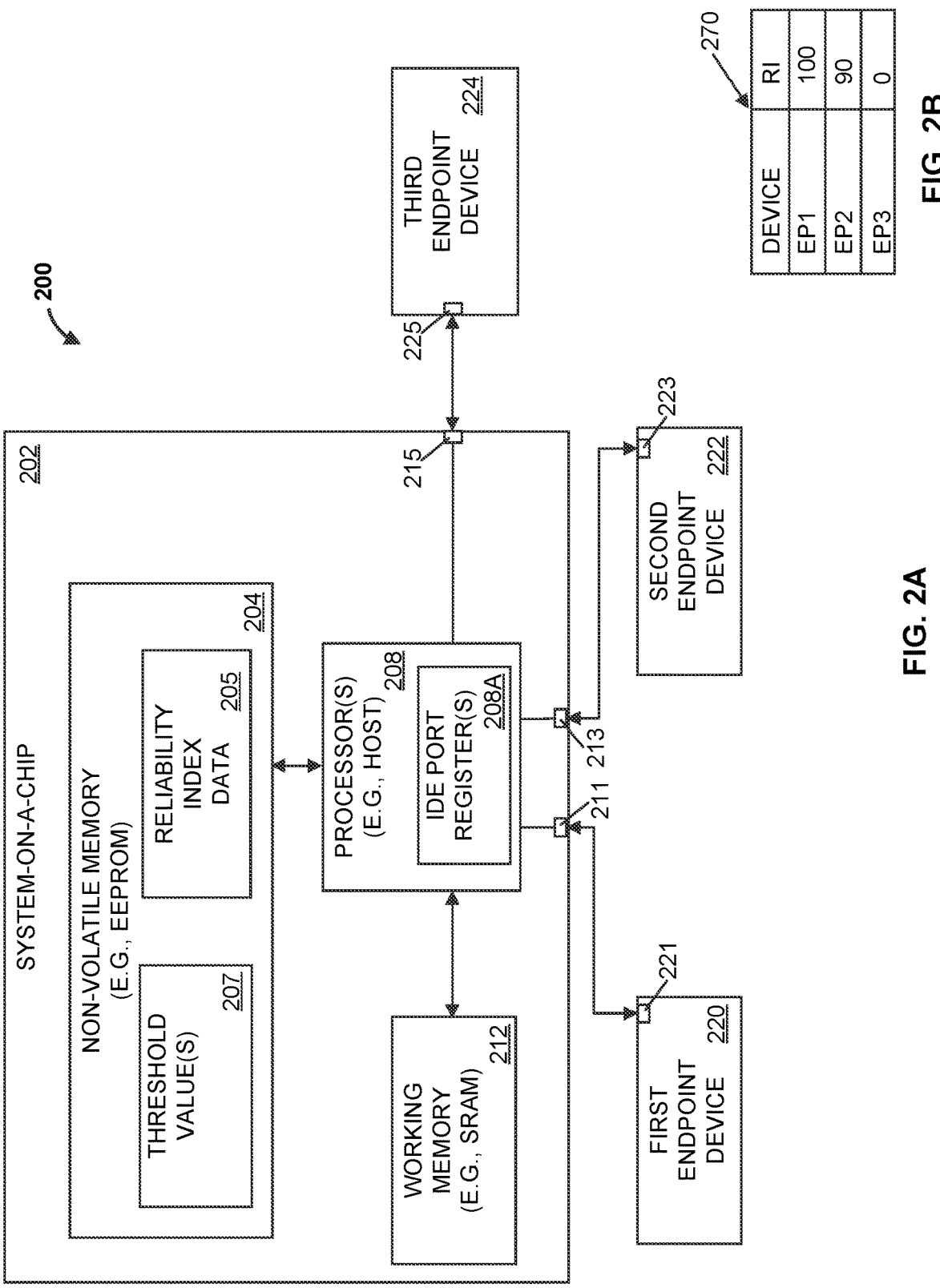
FIG. 2A is a block diagram of a die communication system, according to some implementations.
FIG. 2B illustrates a reliability index table, according to some implementations.

FIG. 2A illustrates a die communication system 200 that includes a system-on-a-chip (SoC) 202, a first endpoint device 220, a second endpoint device 222, and a third endpoint device 224. In this example, SoC 202 includes one or more processors 208 communicatively coupled to a working memory 212 and a non-volatile memory 204. Working memory 212 may allow for the storage of data generated during operations performed by processors 208. Non-volatile memory 204 may include instructions that, when executed by processor 208, causes processor 208 to perform any of the operations described herein. Further, processor 208 may maintain, within non-volatile memory 204, reliability index data 205 (e.g., a calibration file) that can include an RI value for each of the first endpoint device 220, second endpoint device 222, and third endpoint device 224. Non-volatile memory 204 may also store one or more threshold values 207, which are described further below.

Each of the first endpoint device 220, second endpoint device 222, and third endpoint device 224 are coupled to the SoC 202 over corresponding ports. For example, first endpoint device 220 includes a port 221 that is communicatively coupled (e.g., over one or more signals) to a port 211 of the SoC 202. Similarly, second endpoint device 222 includes a port 223 that is communicatively coupled to a port 213 of the SoC 202, and third endpoint device 224 includes a port 225 that is communicatively coupled to a port 215 of the SoC 202. Processor 208 may establish a link session (e.g., IDE session) with each of the first endpoint device 220, second endpoint device 222, and third endpoint device 224 over the corresponding ports.

For example, processor 208 may initially establish a secure session with each of the first endpoint device 220, second endpoint device 222, and third endpoint device 224 through corresponding SPDM messages exchanged over the corresponding ports. Once a secure session established, processor 208 may exchange key-related data with each of the first endpoint device 220, second endpoint device 222, and third endpoint device 224 over the secure session to program and activate keys for encrypting and decrypting data (e.g., flits). After the keys have been programmed, processor 208 may establish a link session (e.g., IDE stream) with each of the first endpoint device 220, second endpoint device 222, and third endpoint device 224. Processor 208 may then exchange secure data over the established link sessions (e.g., using the CXL.cache protocol).

As described herein, processor 208 may detect an error within any of the link sessions established with the first endpoint device 220, second endpoint device 222, and third endpoint device 224. When an error is detected, processor 208 may adjust an RI value corresponding to the link session with the error. For instance, a physical layer of processor 208 may detect an error within the link session established with the second endpoint device 222, and may update an IDE port register 208A value, such as an error register value, to indicate the error. Based on the detected error, processor 208 may decrement the RI value of the reliability index data 205 corresponding to the second endpoint device 222. Similarly, processor 208 may detect errors within the link sessions established with first endpoint device 220 and third endpoint device 224 and, in response to the error detection, processor 208 may decrement a corresponding RI value of the reliability index data 205.

Moreover, after decrementing an RI value corresponding to a link session established with one of the first endpoint device 220, second endpoint device 222, and third endpoint device 224, processor 208 may compare the RI value with a corresponding threshold value 207. In some examples, processor 208 compares RI values for any of the first endpoint device 220, second endpoint device 222, and third endpoint device 224 to a same threshold value 207. In some examples, processor 208 compares an RI value for any of the first endpoint device 220, second endpoint device 222, and third endpoint device 224 to a corresponding threshold value 207 (e.g., threshold values 207 may include three threshold values, one for each of the first endpoint device 220, second endpoint device 222, and third endpoint device 224).

Based on a comparison, if processor 208 determines that an RI value matches the threshold value 207, processor 208 disables a corresponding port. For example, if the RI value for the first endpoint device 220 matches the threshold value 207, processor 208 writes to an IDE port register 208A to disable port 211. As such, processor 208 and first endpoint device 220 can no longer establish link sessions. Similarly, if processor 208 determines that the RI value for the second endpoint device 222 matches the threshold value 207, processor 208 writes to an IDE port register 208A to disable port 213. Further, if processor 208 determines that the RI value for the third endpoint device 224 matches the threshold value 207, processor 208 writes to an IDE port register 208A to disable port 215.

In some examples, processor 208 disables a corresponding port only if a port disabling feature is enabled. For example, IDE port registers 208A may include a capability register (e.g., an IDE Capability Register) that includes at least one bit that indicates whether the port disabling feature is enabled. For instance, if a bit is set (e.g., set to "1"), the port disabling feature is enabled, and if the bit is clear (e.g., set to "0"), the port disabling feature is disabled. Processor 208 may read the capability register, and determine if the port disabling feature is enabled based on the bit. If the port disabling feature is enabled, processor 208 decrements RI values and disables a corresponding port when an RI value matches a threshold value 207. If the port disabling feature is not enabled, processor 208 does not decrement RI values, and instead re-establishes link sessions when errors occur.

FIG. 2B illustrates a reliability index table 270 that may be maintained within reliability index data 205, and which identifies RI values for various endpoints. For example, as illustrated, the RI value for device "EP1" (i.e., endpoint 1) is 100, while the RI value for device "EP2" is 90, and the RI value for device "EP3" is 0. In this example, and assuming that the RI values were initialized to a hundred, device "EP1" has not experienced any errors, device "EP2" has experienced ten errors, and device "EP3" has experienced a hundred errors.

For instance, processor 208 may maintain reliability index table 270 within reliability index data 205 stored in non-volatile memory 204, where "EP1" corresponds to the first endpoint device 220, device "EP2" corresponds to the second endpoint device 222, and device "EP3" corresponds to the third endpoint device 224. Processor 208 may initialize the RI values of the reliability index table 270 to one hundred, for instance. As described herein, processor 208 may establish link sessions with each of the first endpoint device 220, second endpoint device 222, and third endpoint device 224. Assuming errors are detected within any of the link sessions, processor 208 may decrement the corresponding RI values. If an RI value decrements to, for example, zero (e.g., as indicated by a threshold value 207 of zero), processor 208 performs operations to disable the corresponding port.

For instance, assume that SoC 202 initializes the RI values for "EP1," "EP2," and "EP3" of the reliability index table 270 to one hundred, and that the threshold value 207 is zero. As illustrated in FIG. 2B, because SoC 202 has not detected errors for the link session with the first endpoint device 220, the RI value for "EP1" remains at 100. SoC 202, however, has detected errors within the link session with the second endpoint device 222. Specifically, SoC 202 has detected ten errors, causing the link session to be re-established ten times, and thus has decremented the RI value for "EP2" to 90 (100−10=90). Although the RI value for "EP2" has been decremented to 90, SoC 202 still re-establishes the link session with the second endpoint device 222, and the RI value has not reached the threshold value of zero. Further, SoC 202 has detected an error, and re-established the link session, with the third endpoint device 224 one hundred times, as indicated by the RI value of zero for "EP3." Because the RI value has reached zero, as described herein SoC 202 disables the port (e.g., port 215) corresponding to the third endpoint device 224 (e.g., by writing to an IDE port register 208A), thereby preventing any additional link sessions from being established with third endpoint device 224.

Figure 3:
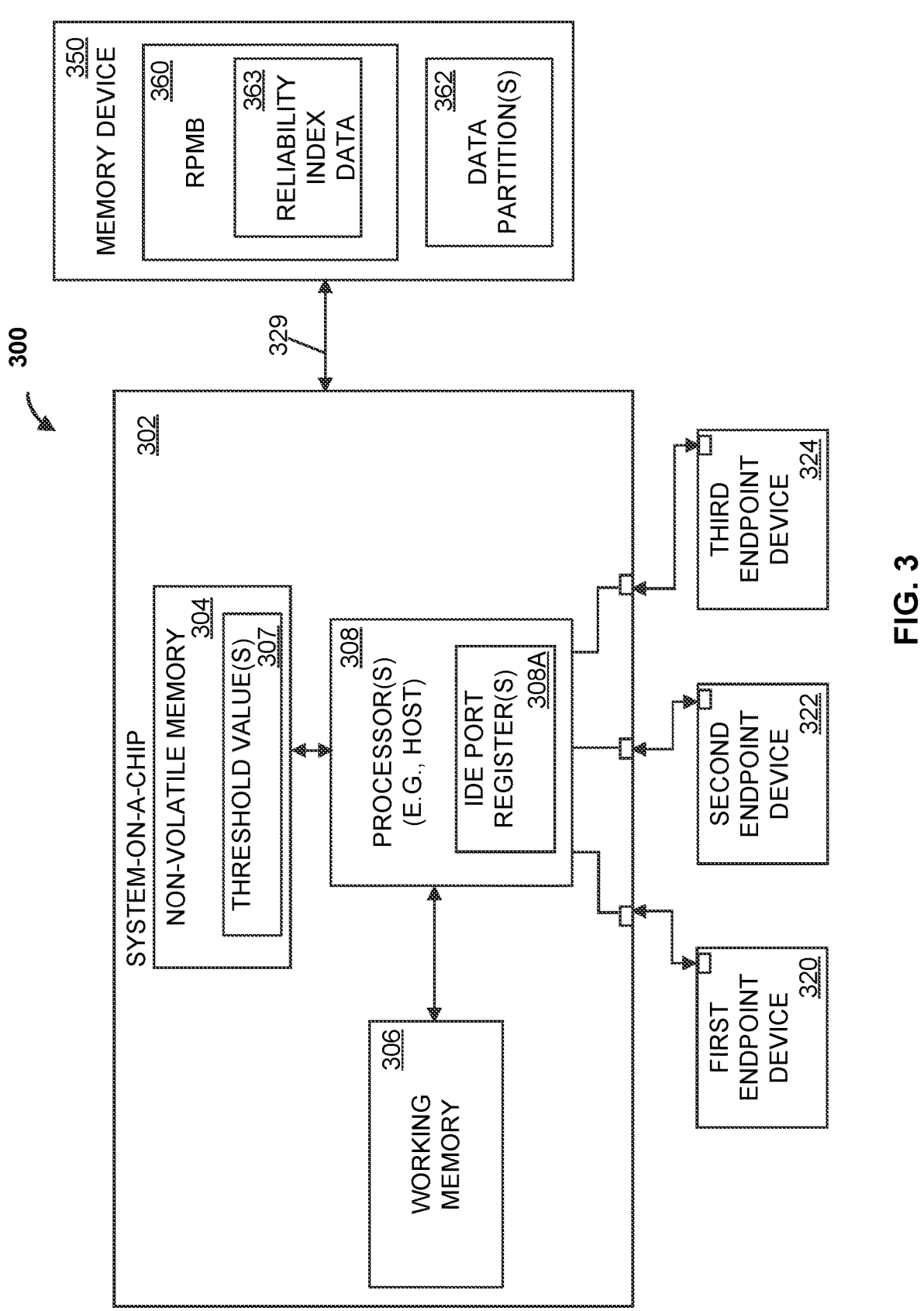
FIG. 3 illustrates block diagram of another die communication system, according to some implementations.

FIG. 3 illustrates a die communication system 300 that includes a system-on-a-chip (SoC) 302 communicatively coupled to a first endpoint device 320, a second endpoint device 322, and a third endpoint device 324. In this example, SoC 302 includes one or more processors 308 communicatively coupled to a working memory 306 and a non-volatile memory 304. Working memory 306 may allow for the storage of data generated during operations performed by processors 308. Non-volatile memory 304 may include instructions that, when executed by processor 308, causes processor 308 to perform any of the operations described herein. In addition, die communication system 300 includes a memory device 350. Memory device 350 may be a secure FLASH memory, for instance. As illustrated, the memory device 350 may include an access controlled memory block, such as Replay Protected Memory Block (RPMB) 360, and one or more data partitions 362.

Processor 308 may communicate with (e.g., write data to, read data from) the memory device 350 over communication bus 329. For instance, processor 308 may maintain reliability index data 363 within the RPMB 360 of the memory device 350. The reliability index data 363 may include an RI value for each of the first endpoint device 320, second endpoint device 322, and third endpoint device 324. As described herein, processor 308 may decrement the RI values corresponding to each of the first endpoint device 320, second endpoint device 322, and third endpoint device 324 when processor 308 detects an error within an established link session.

For example, processor 308 may establish a link session (e.g., IDE session) with each of the first endpoint device 320, second endpoint device 322, and third endpoint device 324 over corresponding ports. As described herein, for instance, processor 308 may initially establish a secure session with each of the first endpoint device 320, second endpoint device 322, and third endpoint device 324 through, e.g., corresponding SPDM messages. Once a secure session established, processor 308 may exchange key-related data with each of the first endpoint device 320, second endpoint device 322, and third endpoint device 324 over the secure session to program and activate keys for encrypting and decrypting data (e.g., flits). After the keys have been programmed, processor 308 may establish a link session (e.g., IDE stream) with each of the first endpoint device 320, second endpoint device 322, and third endpoint device 324. Processor 308 may then exchange secure data over the established link sessions (e.g., using the CXL.cache protocol).

As described herein, processor 308 may detect an error within any of the link sessions established with the first endpoint device 320, second endpoint device 322, and third endpoint device 324. When an error is detected, processor 308 may adjust an RI value corresponding to the link session with the error. For instance, a physical layer of processor 308 may detect an error within the link session established with the first endpoint device 320, and may update an IDE port register 308A value, such as an error register value, to indicate the error. Based on the detected error, processor 308 may decrement the RI value of the reliability index data 363 corresponding to the first endpoint device 320. Similarly, processor 308 may detect errors within the link sessions established with the second endpoint device 322 and the third endpoint device 324 and, in response to the error detection, processor 308 may decrement a corresponding RI value of the reliability index data 363.

Moreover, after decrementing an RI value corresponding to a link session established with one of the first endpoint device 320, second endpoint device 322, and third endpoint device 324, processor 308 may compare the RI value with a corresponding threshold value 307. The threshold values 307 may be stored within non-volatile memory 304. In some examples, processor 308 compares RI values for any of the first endpoint device 320, second endpoint device 322, and third endpoint device 324 to a same threshold value 307. In some examples, processor 308 compares an RI value for any of the first endpoint device 320, second endpoint device 322, and third endpoint device 324 to a corresponding threshold value 307.

Based on a comparison, if processor 308 determines that an RI value matches the threshold value 307, processor 308 disables a corresponding port. For example, if the RI value for the first endpoint device 320 matches the threshold value 307, processor 308 writes to an IDE port register 308A to disable the port connected to the first endpoint device 320. As such, processor 308 and first endpoint device 320 can no longer establish link sessions. Similarly, if processor 308 determines that the RI value for the second endpoint device 322 matches the threshold value 307, processor 308 writes to an IDE port register 308A to disable the port connected to the second endpoint device 322. Further, if processor 308 determines that the RI value for the third endpoint device 324 matches the threshold value 307, processor 308 writes to an IDE port register 208A to disable the port connected to the third endpoint device 324.

In some examples, processor 308 disables a corresponding port only if a port disabling feature is enabled. For example, IDE port registers 308A may include a capability register (e.g., an IDE Capability Register) that includes at least one bit that indicates whether the port disabling feature is enabled. Processor 308 may read the capability register, and determine if the port disabling feature is enabled based on the bit. If the port disabling feature is enabled, processor 308 decrements RI values and disables a corresponding port when an RI value matches the threshold value 307. If the port disabling feature is not enabled, processor 308 does not decrement RI values, and instead re-establishes link sessions when errors occur.

Figure 4:
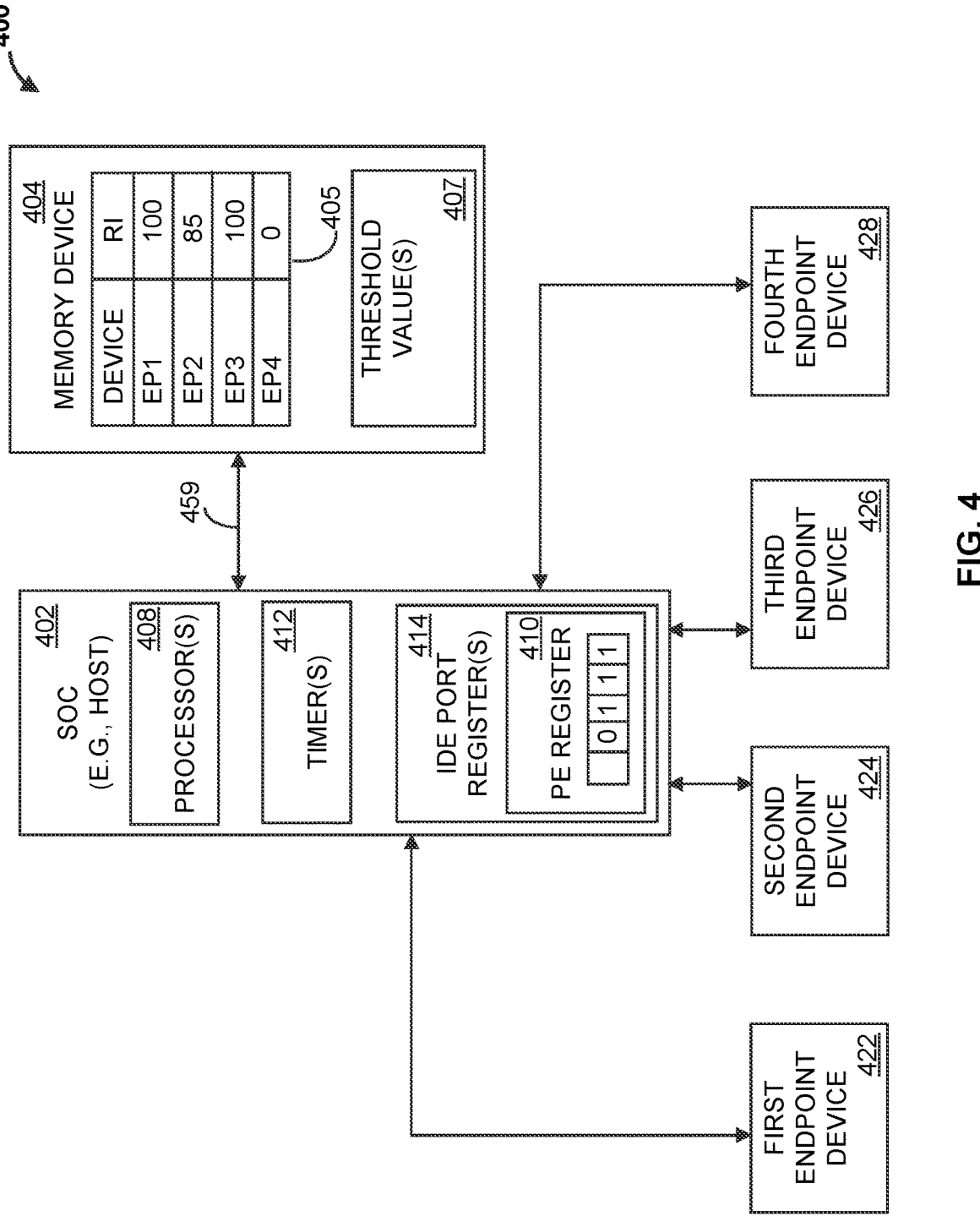
FIG. 4 illustrates block diagram of yet another die communication system, according to some implementations.

FIG. 4 illustrates a die communication system 400 that includes a system-on-a-chip (SoC) 402 communicatively coupled to a first endpoint device 422, a second endpoint device 424, a third endpoint device 426, and a fourth endpoint device 428. In this example, SoC 402 includes one or more processors 408 communicatively coupled to a memory device 404. SoC 402 further includes one or more timers 412, and IDE port registers 414 that include a port enable register 410. The port enable register 410 may cause ports to be enabled or disabled, as described further below. Further, as illustrated, memory device 404 stores a reliability index table 405 that includes an RI value for each of the first endpoint device 422 (i.e., "EP1"), the second endpoint device 424 (i.e., "EP2"), the third endpoint device 426 (i.e., "EP3"), and the fourth endpoint device 428 (i.e., "EP4"). Memory device 404 further stores one or more threshold values 407 indicating a total number of link session errors that can be encountered before a port is disabled.

Processor 408 may communicate with (e.g., write data to, read data from) the memory device 404 over communication bus 459. As described herein, processor 408 may decrement the RI values corresponding to each of the first endpoint device 422 (i.e., "EP1"), the second endpoint device 424 (i.e., "EP2"), the third endpoint device 426 (i.e., "EP3"), and the fourth endpoint device 428 (i.e., "EP4") when processor 408 detects an error within a corresponding established link session.

For example, as described herein, processor 408 may establish a link session (e.g., IDE session) with each of the first endpoint device 422, the second endpoint device 424, the third endpoint device 426, and the fourth endpoint device 428 over corresponding ports. Once the link sessions are established allowing SoC 402 and the first endpoint device 422, the second endpoint device 424, the third endpoint device 426, and the fourth endpoint device 428 to securely communicate, SoC 402 may detect an error within any of the established link sessions. When processor 408 detects an error, processor 408 may adjust the RI value within the reliability index table 405 corresponding to the link session with the error.

Moreover, after decrementing an RI value corresponding to a link session established with one of the first endpoint device 422, the second endpoint device 424, the third endpoint device 426, and the fourth endpoint device 428, processor 408 may compare the RI value with a corresponding threshold value 407. Based on the comparison, processor 408 may determine that an RI value matches the threshold value 407 and, in response may disable a corresponding port.

For example, processor 408 may initialize each of the RI values of the reliability index table 405 205 to a starting value, such as 100. Further, processor 408 may initialize the port enable register 410 to have one or more ports enabled (e.g., by setting corresponding bits to "1" as described further below). Based on detected errors, processor 408 may decrement RI values, and may disable a corresponding port when an RI value matches a threshold value 407.

For instance, as illustrated, reliability index table 405 indicates that the RI value for the first endpoint device 422 (i.e., "EP1") and the third endpoint device 426 (i.e., "EP3") are 100, and thus no errors have been detected within any of these link sessions (in an example where the RI values were initialized to 100). Reliability index table 405 further indicates that the RI value for the second endpoint device 424 (i.e., "EP2") is 85. As such, SoC 402 has decremented the RI value fifteen times, indicating that fifteen errors have been detected (e.g., and SoC 402 has re-established the link session with the second endpoint device 424 fifteen times). Reliability index table 405 also indicates that the RI value for the fourth endpoint device 428 is zero. In an example where the threshold value 407 is zero, and because the RI value matches the threshold value 407 (i.e., they are both zero), processor 408 writes to the port enable register 410 to disable a corresponding port.

For instance, the port enable register 410 may include a bit corresponding to each of four ports, each port connected to one of the first endpoint device 422, the second endpoint device 424, the third endpoint device 426, and the fourth endpoint device 428. In this example, a setting of "1" indicates that a corresponding port is enabled, while a setting of "0" indicates that the corresponding port is disabled. As illustrated, three bits of the port enable register 410, which correspond to ports for the first endpoint device 422, the second endpoint device 424, and the third endpoint device 426, are set to "1," and thereby the ports are enabled. Processor 408, however, has set a fourth bit corresponding to the port for the fourth endpoint device 428 to "0," based on determining that the RI value for the fourth endpoint device 428 (i.e., "EP 4") matches the threshold value 407. As such, because the port for the fourth endpoint device 428 is disabled, SoC 402 and fourth endpoint device 428 cannot establish further link sessions.

In some examples, processor 408 initiates a timer 412 when a port is disabled. For instance, and based on disabling the port for the fourth endpoint device 428, processor 408 may initiate a timer for a predetermined amount of time (e.g., an hour, a day, a week, a month, a year, etc.). Based on the time, the processor 408 may detect when the predetermined amount of time has expired, and in response may re-enable the corresponding port. For example, the processor 408 may receive an interrupt signal from the timer 412 when the timer expires. Upon receiving the interrupt, the processor 408 may set the bit corresponding to the fourth endpoint device 428 to "1," and may attempt to re-establish a link session with the fourth endpoint device 428.

Figure 5:
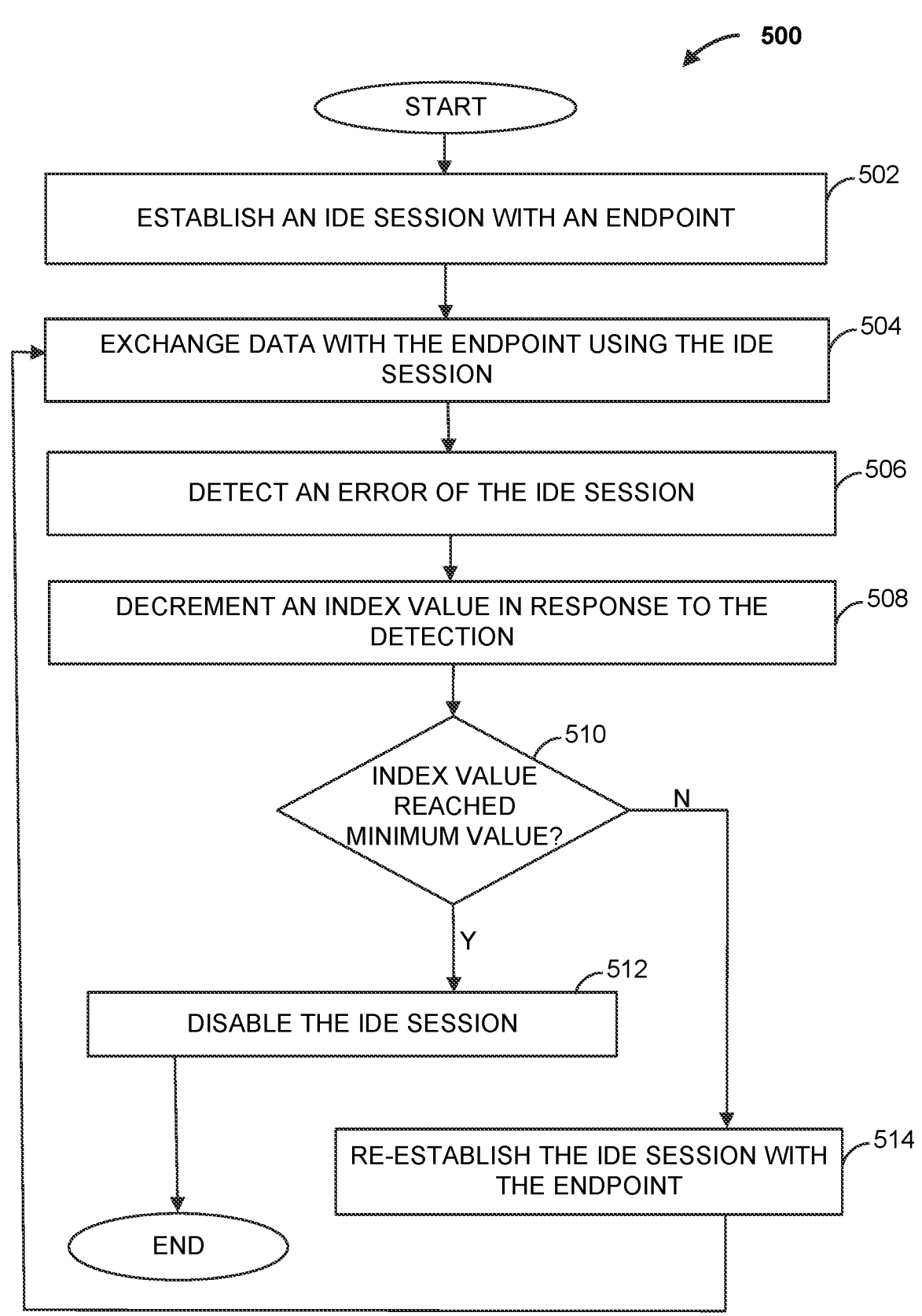
FIG. 5 is a flowchart of an exemplary process for disabling a link session, according to some implementations.

FIG. 5 is a flowchart of an exemplary process 500 for disabling a link session, in accordance with some embodiments. Exemplary process 500 may be carried out by a host, such as any of processors 208, 308, 408. Beginning at block

502, the host establishes an IDE session with an endpoint. For instance, as described herein, the host may exchange SPDM messages to establish a secure session. Once the secure session is re-established, the host and endpoint may exchange key-related data over the established secure session to program and activate the keys for encrypting and decrypting data. At block 504, the host exchanges data with the endpoint using the established IDE session. For instance, the host and endpoint may exchange secure data using the IDE session.

Further, and at block 506, the host detects an error of the IDE session. For instance, as described herein, the host may receive a signal indicating an error within the secure data of the IDE session. At block 508, the host decrements an index value in response to the error detection. For example, the host may decrement an RI value of reliability index data (e.g., reliability index data 205) corresponding to the endpoint.

Proceeding to block 510, the host determines whether the index value has reached a minimum value. For instance, the host may compare the index value to a threshold value, such as threshold value 207, to determine whether the index value has reached the threshold value (e.g., whether the index value matches the threshold value). If the index value has not reached the minimum value, the method proceeds to block 514. At block 514, the host re-establishes the link session with the corresponding endpoint. For example, as described herein, the host and the endpoint re-establish the initial secure session through exchanged SPDM messages. Once the initial secure session is re-established, the host and endpoint re-exchange key-related data over the re-established secure session to program and activate the keys for encrypting and decrypting data. After the keys have been established, the IDE session is re-established, and secure data may again be exchanged between the host and the endpoint using the IDE session at block 504.

Back at block 510, if the index value has not reached the minimum value, the method proceeds to block 512. At block 512, the host disables the IDE session. For example, as described herein, the host may write to a register, such as a port enable register (e.g., port enable register 410) to disable a port corresponding to the endpoint. As such, the host and endpoint cannot re-establish the IDE session.

Figure 6:
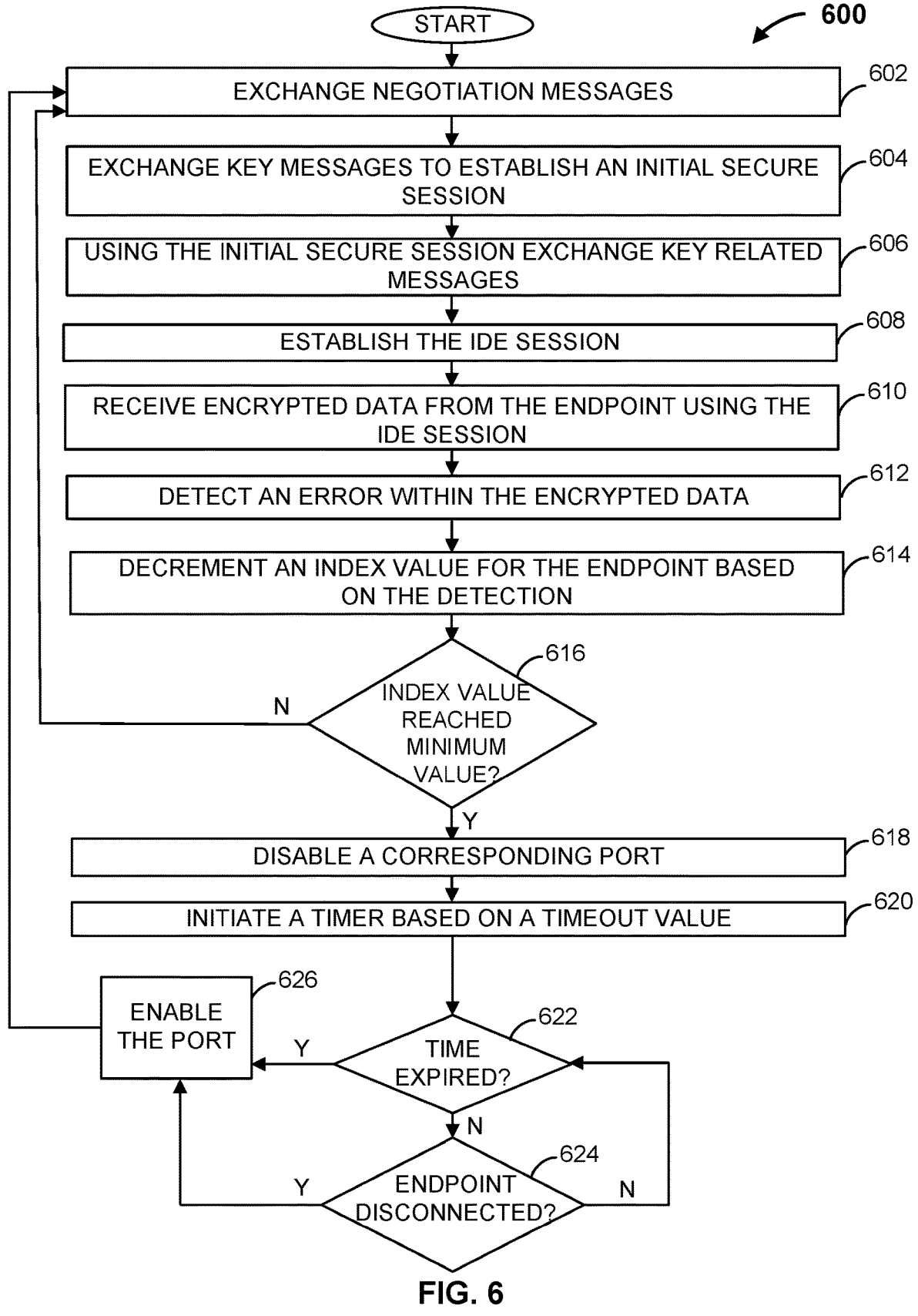
FIG. 6 is a flowchart of another exemplary process for disabling a link session, according to some implementations.

FIG. 6 is a flowchart of an exemplary process 600 for disabling a link session, in accordance with some embodiments. Exemplary process 600 may be carried out by a host, such as any of processors 208, 308, 408. Beginning at block 602, the host and endpoint exchange negotiation messages (e.g., unencrypted, in the clear). For instance, the host may transmit one or more SPDM messages, such as an SPDM GET_VERSION message, an SPDM GET_CAPABILITIES message, and an SPDM NEGOTIATE_ALGORITHM message, to the endpoint, and may receive responses to each of these messages from the endpoint. At block 604, the host and endpoint exchange key messages to establish an initial secure session. For example, the host may transmit an SPDM KEY_EXCHANGE message to the endpoint, and may receive a response from the endpoint. Further, the host may transmit an SPDM FINISH message to the endpoint, and may receive an SPDM FINISH_RESPONSE message from the endpoint. The initial secure session is now established.

At block 606, the host and endpoint, using the initial secure session, exchange key related messages to establish an IDE session. For example, the host and endpoint may exchange one or more SPDM messages according to an IDE Key Management protocol (e.g., SPDM VENDOR_DE- FINED_REQUEST, SPDM VENDOR_DEFINED_RESPONSE messages). Based on the exchanged key related messages, at block 608, the IDE session between the host and the endpoint is established.

Further, at block 610, the host receives encrypted data from the endpoint using the IDE session. At block 612, the host detects an error within the encrypted data. The error may have been caused, for example, due to noncompliant operating procedures, non-compliant data transfers, software defects, or compromised hardware, for instance. Based on the detected error, at block 614, the host decrements an index value for the endpoint based on the detection. For instance, the host may decrement an RI value of reliability index data (e.g., reliability index data 205) corresponding to the endpoint.

Proceeding to block 616, the host determines whether the index value has reached a minimum value. For instance, the host may compare the index value to a threshold value, such as threshold value 207, to determine whether the index value has reached the threshold value (e.g., whether the index value matches the threshold value). If the index value has not reached the minimum value, the method proceeds back to block 602 to re-establish the link session with the endpoint. If, however, the index value has reached the minimum value, the method proceeds to block 618.

At block 618, the host disables a port corresponding to the IDE session. For example, as described herein, the host may write to a register, such as a port enable register (e.g., port enable register 410), to disable a port corresponding to the endpoint. The method then proceeds to block 620, where the host initiates a timer based on a timeout value. For instance, the host may configure a timer, such as timer 412, to the timeout value. Proceeding to block 622, if the timer has expired, the method proceeds back to block 626 where the port is re-enabled. For instance, the host may write to the register to re-enable the port. The method then proceeds back to block 602 to re-establish the link session with the endpoint. If, however, at block 622 the timer has not expired, the method proceeds to block 624.

At block 624, the host determines whether the endpoint has been physically disconnected. For example, a physical layer of the host may receive a signal if the endpoint is physically removed from the connection to the host. If the host detects that the endpoint has been disconnected, the method proceeds back to block 626 where the port is re-enabled. From block 626, the method proceeds back to block 602 to attempt to re-establish a link session when an endpoint is reconnected to the same connection (e.g., to the same port). If, however, at block 624 the endpoint has not been physically removed from the connection to the host, the method proceeds back to block 622 to determine if the timer has expired.

Implementation examples are further described in the following numbered clauses:

1. An apparatus comprising:
   a non-transitory, machine-readable storage medium storing instructions; and
   at least one processor coupled to the non-transitory, machine-readable storage medium, wherein the at least one processor is configured to execute the instructions to:
      detect an error within a link session with a device;
      decrement an index value corresponding to the link session based on the detected error;
      compare the index value to a threshold value; and
      disable the link session with the device based on the comparison.

2. The apparatus of clause 1, wherein the at least one processor is configured to execute the instructions to:
receive a signal; and
detect the error based on the signal.

3. The apparatus of any of clauses 1-2, wherein the at least one processor is configured to execute the instructions to:
read error data from a register; and
detect the error based on the error data.

4. The apparatus of any of clauses 1-3, wherein the at least one processor is configured to execute the instructions to:
establish an initial session with the device;
program a key to the device using the initial session; and
establish the link session based on programming the key to the device.

5. The apparatus of any of clauses 1-4, wherein the at least one processor is configured to execute the instructions to initialize the index value to an initial value.

6. The apparatus of any of clauses 1-5 comprising a port communicatively coupled to the device, wherein the at least one processor is configured to execute the instructions to write data to a port enable register, the write causing the port to become disabled.

7. The apparatus of clause 6, wherein the at least one processor is configured to execute the instructions to:
receive a signal indicating that the device has been disconnected; and
based on the signal, write additional data to the port enable register, the write causing the port be become enabled.

8. The apparatus of any of clauses 6-7, wherein the port enable register is an Integrity and Data Encryption port register.

9. The apparatus of any of clauses 1-8, wherein the at least one processor is configured to execute the instructions to:
determine the index value matches the threshold value; and
disable the link session with the device based on the determination.

10. The apparatus of any of clauses 1-9, wherein the index value is stored within a Replay Protected Memory Block of a memory device.

11. The apparatus of any of clauses 1-10, wherein the link session is an Integrity and Data Encryption link session.

12. The apparatus of any of clauses 1-11, wherein the at least one processor is configured to execute the instructions to:
initiate a timer based on disabling the link session;
determine the timer expired; and
re-establish the link session with the device based on determining the timer expired.

13. The apparatus of any of clauses 1-12, wherein the at least one processor is configured to execute the instructions to:
read capability data from a capabilities register; and
decrement the index value corresponding to the link session based on the capability data.

14. A method by at least one processor, the method comprising:
detecting an error within a link session with a device;
decrementing an index value corresponding to the link session;
comparing the index value to a threshold value based on the detected error; and
disabling the link session with the device based on the comparison.

15. The method of clause 14, comprising:
receiving a signal; and
detecting the error based on the signal.

16. The method of any of clauses 14-15, comprising:
reading error data from a register; and
detecting the error based on the error data.

17. The method of any of clauses 14-16, comprising:
establishing an initial session with the device;
programing a key to the device using the initial session; and
establishing the link session based on programming the key to the device.

18. The method of any of clauses 14-17, comprising initializing the index value to an initial value.

19. The method of any of clauses 14-18, wherein disabling the link session comprises writing data to a port enable register, the write causing a port communicatively coupled to the device to become disabled.

20. The method of clause 19, comprising:
receiving a signal indicating that the device has been disconnected; and
based on the signal, writing additional data to the port enable register, the write causing the port be become enabled.

21. The method of clause 20, wherein the port enable register is an Integrity and Data Encryption port register.

22. The method of any of clauses 14-21, comprising:
determining the index value matches the threshold value; and
disabling the link session with the device based on the determination.

23. The method of any of clauses 14-22, wherein the index value is stored within a Replay Protected Memory Block of a memory device.

24. The method of any of clauses 14-23, wherein the link session is an Integrity and Data Encryption link session.

25. The method of any of clauses 14-24, comprising:
initiating a timer based on disabling the link session;
determining the timer expired; and
re-establishing the link session with the device based on determining the timer expired.

26. The method of any of clauses 14-25, comprising:
reading capability data from a capabilities register; and
decrementing the index value corresponding to the link session based on the capability data.

27. A non-transitory, machine-readable storage medium storing instructions that, when executed by at least one processor, cause the at least one processor to:
detect an error within a link session with a device;
decrement an index value corresponding to the link session based on the detected error;
compare the index value to a threshold value; and
disable the link session with the device based on the comparison.

28. The non-transitory, machine-readable storage medium of clause 27, wherein the instructions, when executed by the at least one processor, cause the at least one processor to:
receive a signal; and
detect the error based on the signal.

29. The non-transitory, machine-readable storage medium of any of clauses 27-28, wherein the instructions, when executed by the at least one processor, cause the at least one processor to:

read error data from a register; and detect the error based on the error data.

30. The non-transitory, machine-readable storage medium of any of clauses 27-29, wherein the instructions, when executed by the at least one processor, cause the at least one processor to:

establish an initial session with the device;

program a key to the device using the initial session; and establish the link session based on programming the key to the device.

31. The non-transitory, machine-readable storage medium of any of clauses 27-30, wherein the instructions, when executed by the at least one processor, cause the at least one processor to initialize the index value to an initial value.

32. The non-transitory, machine-readable storage medium of any of clauses 27-31, wherein the instructions, when executed by the at least one processor, cause the at least one processor to write data to a port enable register, the write causing the port to become disabled.

33. The non-transitory, machine-readable storage medium of clause 32, wherein the instructions, when executed by the at least one processor, cause the at least one processor to:

receive a signal indicating that the device has been disconnected; and based on the signal, write additional data to the port enable register, the write causing the port be become enabled.

34. The non-transitory, machine-readable storage medium of any of clauses 32-33, wherein the port enable register is an Integrity and Data Encryption port register.

35. The non-transitory, machine-readable storage medium of any of clauses 27-34, wherein the instructions, when executed by the at least one processor, cause the at least one processor to:

determine the index value matches the threshold value; and disable the link session with the device based on the determination.

36. The non-transitory, machine-readable storage medium of any of clauses 27-35, wherein the index value is stored within a Replay Protected Memory Block of a memory device.

37. The non-transitory, machine-readable storage medium of any of clauses 27-36, wherein the link session is an Integrity and Data Encryption link session.

38. The non-transitory, machine-readable storage medium of any of clauses 27-37, wherein the instructions, when executed by the at least one processor, cause the at least one processor to:

initiate a timer based on disabling the link session;

determine the timer expired; and re-establish the link session with the device based on determining the timer expired.

39. The non-transitory, machine-readable storage medium of any of clauses 27-38, wherein the instructions, when executed by the at least one processor, cause the at least one processor to:

read capability data from a capabilities register; and decrement the index value corresponding to the link session based on the capability data.

40. An die comprising:

a first port configured to provide a link session with a device;

at least one register; and a processor communicatively coupled to the first port and the at least one register, wherein the processor is configured to:

establish the link session with the device using the first port;

read a value from the at least one register and, based on the value, detect an error within the link session;

decrement an index value corresponding to the link session based on the detected error;

compare the index value to a threshold value; and based on the comparison, write a second value to the at least one register, the write causing a disabling of the link session with the device.

Although the methods described above are with reference to the illustrated flowcharts, many other ways of performing the acts associated with the methods may be used. For example, the order of some operations may be changed, and some embodiments may omit one or more of the operations described and/or include additional operations.

In addition, the methods and system described herein may be at least partially embodied in the form of computer-implemented processes and apparatus for practicing those processes. The disclosed methods may also be at least partially embodied in the form of tangible, non-transitory machine-readable storage media encoded with computer program code that, when executed, causes a machine to fabricate at least one integrated circuit that performs one or more of the operations described herein. For example, the methods may be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for causing a machine to fabricate the integrated circuit. The methods may also be at least partially embodied in the form of a computer into which computer program code is loaded or executed, such that, the computer becomes a special purpose computer for causing a machine to fabricate the integrated circuit. For instance, when implemented on a general-purpose processor, computer program code segments can configure the processor to create specific logic circuits. The methods may alternatively be at least partially embodied in application specific integrated circuits or any other integrated circuits for performing the methods.

In addition, terms such as "circuit," "circuitry," "logic," and the like can include, alone or in combination, analog circuitry, digital circuitry, hardwired circuitry, programmable circuitry, processing circuitry, hardware logic circuitry, state machine circuitry, and any other suitable type of physical hardware components. Further, the embodiments described herein may be employed within various types of devices such as networking devices, telecommunication devices, smartphone devices, gaming devices, enterprise devices, storage devices (e.g., cloud storage devices), and computing devices (e.g., cloud computing devices), among other types of devices.

The subject matter has been described in terms of exemplary embodiments. Because they are only examples, the claimed inventions are not limited to these embodiments. Changes and modifications may be made without departing the spirit of the claimed subject matter. It is intended that the claims cover such changes and modifications.

We claim:

1. An apparatus comprising:
a non-transitory, machine-readable storage medium storing instructions, the storage medium comprising a non-volatile memory; and
at least one processor coupled to the non-transitory, machine-readable storage medium, wherein the at least one processor is configured to execute the instructions to:
detect an error within a link session established over a die interconnect between the at least one processor and a die;
decrement an index value stored in the non-volatile memory coupled to the at least one processor, the index value corresponding to the link session based on the detected error;
compare the index value to a threshold value; and
disable the link session with the die based on the comparison by writing data to a port enabled register.

2. The apparatus of claim 1, wherein the at least one processor is configured to execute the instructions to: receive a signal; and detect the error based on the signal.

3. The apparatus of claim 1, wherein the at least one processor is configured to execute the instructions to: read error data from a register; and detect the error based on the error data.

4. The apparatus of claim 1, wherein the at least one processor is configured to execute the instructions to:
establish an initial session with the die;
program a key to the device using the initial session; and
establish the link session based on programming the key to the die.

5. The apparatus of claim 1, wherein the at least one processor is configured to execute the instructions to initialize the index value to an initial value.

6. The apparatus of claim 1 comprising a port communicatively coupled to the device die, wherein the at least one processor is configured to execute the instructions to write data to the port enable register, the write causing the port to become disabled.

7. The apparatus of claim 6, wherein the at least one processor is configured to execute the instructions to:
receive a signal indicating that the die has been disconnected; and
based on the signal, write additional data to the port enable register the write causing the port to become enabled.

8. The apparatus of claim 6, wherein the port enable register is an Integrity and Data Encryption port register.

9. The apparatus of claim 1, wherein the at least one processor is configured to execute the instructions to:
determine the index value matches the threshold value; and
disable the link session with the die based on the determination.

10. The apparatus of claim 1, wherein the index value is stored within a Replay Protected Memory Block of the non-volatile memory.

11. The apparatus of claim 1, wherein the link session is an Integrity and Data Encryption link session.

12. The apparatus of claim 1, wherein the at least one processor is configured to execute the instructions to:

initiate a timer based on disabling the link session;
determine the timer expired; and
re-establish the link session with the die based on determining the timer expired.

13. The apparatus of claim 1, wherein the at least one processor is configured to execute the instructions to:
read capability data from a capabilities register; and
decrement the index value corresponding to the link session based on the capability data.

14. A method by at least one processor, the method comprising:
detecting an error within a link session established over a die interconnect between the at least one processor and a die;
decrementing an index value stored in a non-volatile memory coupled to the at least one processor, the index value corresponding to the link session;
comparing the index value to a threshold value based on the detected error; and
disabling the link session with the die based on the comparison, the disabling caused by writing data to a port enabled register.

15. The method of claim 14, comprising:
receiving a signal; and
detecting the error based on the signal.

16. The method of claim 14, comprising:
reading error data from a register; and
detecting the error based on the error data.

17. The method of claim 14, comprising:
establishing an initial session with the die;
programing a key to the die using the initial session; and
establishing the link session over the die interconnect based on programming the key to the die.

18. The method of claim 14, wherein disabling the link session comprises writing data to the port enable register, the write causing a port communicatively coupled to the device die to become disabled.

19. The method of claim 18, comprising:
receiving a signal indicating that the die has been disconnected; and
based on the signal, writing additional data to the port enable register, the write causing the port to become enabled.

20. An die comprising:
a first port coupled to a die interconnect configured to provide a link session established over the die interconnect between a processor and a die;
at least one register; and
the processor communicatively coupled to the first port and the at least one register, wherein the processor is configured to:
establish the link session with the die using the first port coupled to a die interconnect;
read a value from the at least one register and, based on the value, detect an error within the link session;
decrement an index value stored in a non-volatile memory coupled to the processor, the index value corresponding to the link session based on the detected error;
compare the index value to a threshold value; and
based on the comparison, write a second value to the at least one register, the write causing a disabling of the link session with the die.

* * * * *